United States Patent
Liu et al.

(10) Patent No.: US 10,527,793 B1
(45) Date of Patent: Jan. 7, 2020

(54) DUMP TERMINATOR

(71) Applicant: Elenion Technologies, LLC, New York, NY (US)

(72) Inventors: Yang Liu, Elmhurst, NY (US); Ruizhi Shi, New York, NY (US); Tal Galfsky, Morristown, NJ (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/255,971

(22) Filed: Jan. 24, 2019

(51) Int. Cl.
*G02B 6/24* (2006.01)

(52) U.S. Cl.
CPC .................. *G02B 6/243* (2013.01)

(58) Field of Classification Search
None
See application file for complete search history.

(56) References Cited

U.S. PATENT DOCUMENTS

2012/0251041 A1* 10/2012 Ishikawa ............ G02B 6/12019
385/14
2015/0212271 A1* 7/2015 Chen ...................... G02B 6/243
385/14

FOREIGN PATENT DOCUMENTS

GB   2124403 A  *  2/1984

* cited by examiner

*Primary Examiner* — Michael Stahl
(74) *Attorney, Agent, or Firm* — Stratford Managers Corporation

(57) ABSTRACT

When routing light on photonic integrated circuit (PIC) chips optical back-reflection and scattering can be highly detrimental to the desired application. Unused ports of optical devices, such as MMI, DC, Y-junction, PD, etc. are a cause for back-reflection and scattering, whereby the scattered light could get picked up by adjacent components, e.g. photodetectors. Management of stray light on the PIC is needed to prevent the undesired coupling between various components and to reduce noise. A dump taper may be used to guide and scatter stray light away from sensitive components or fully absorb the light while maintaining very low reflection from the taper. A doped dump taper may be used to passively absorb light reaching the unused port, thereby eliminating unwanted reflection and scattering. Alternatively, an undoped taper may be used to scatter light away from sensitive components while maintaining very low back-reflection.

15 Claims, 8 Drawing Sheets

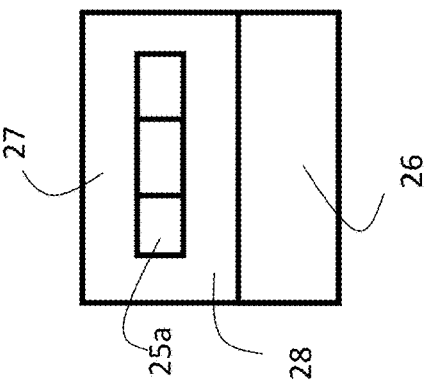
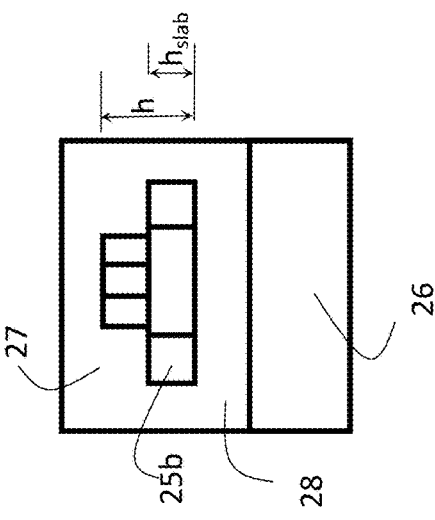
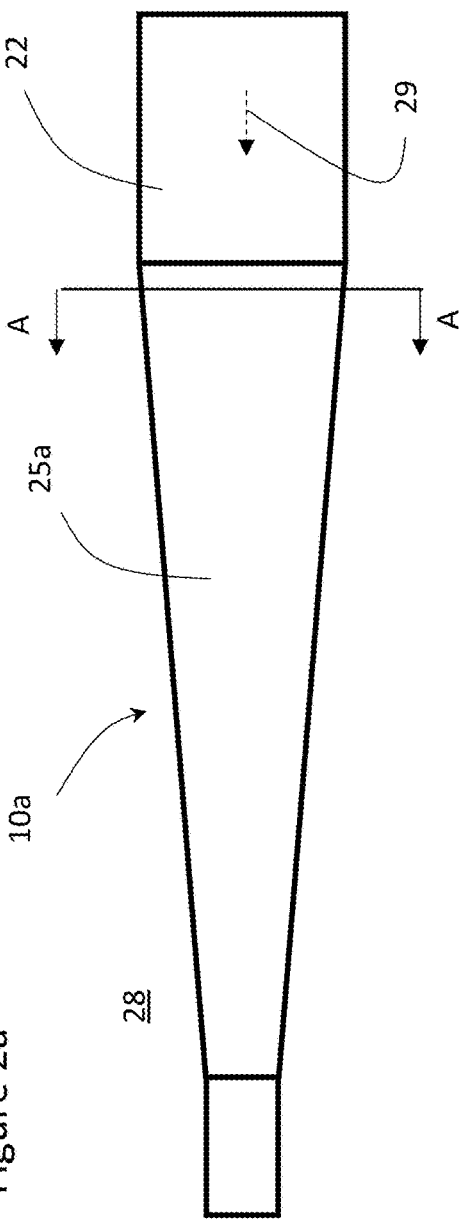
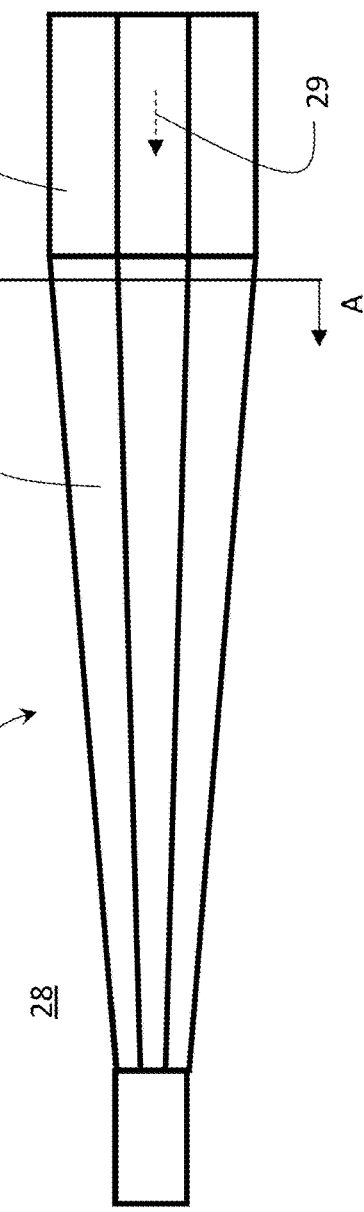

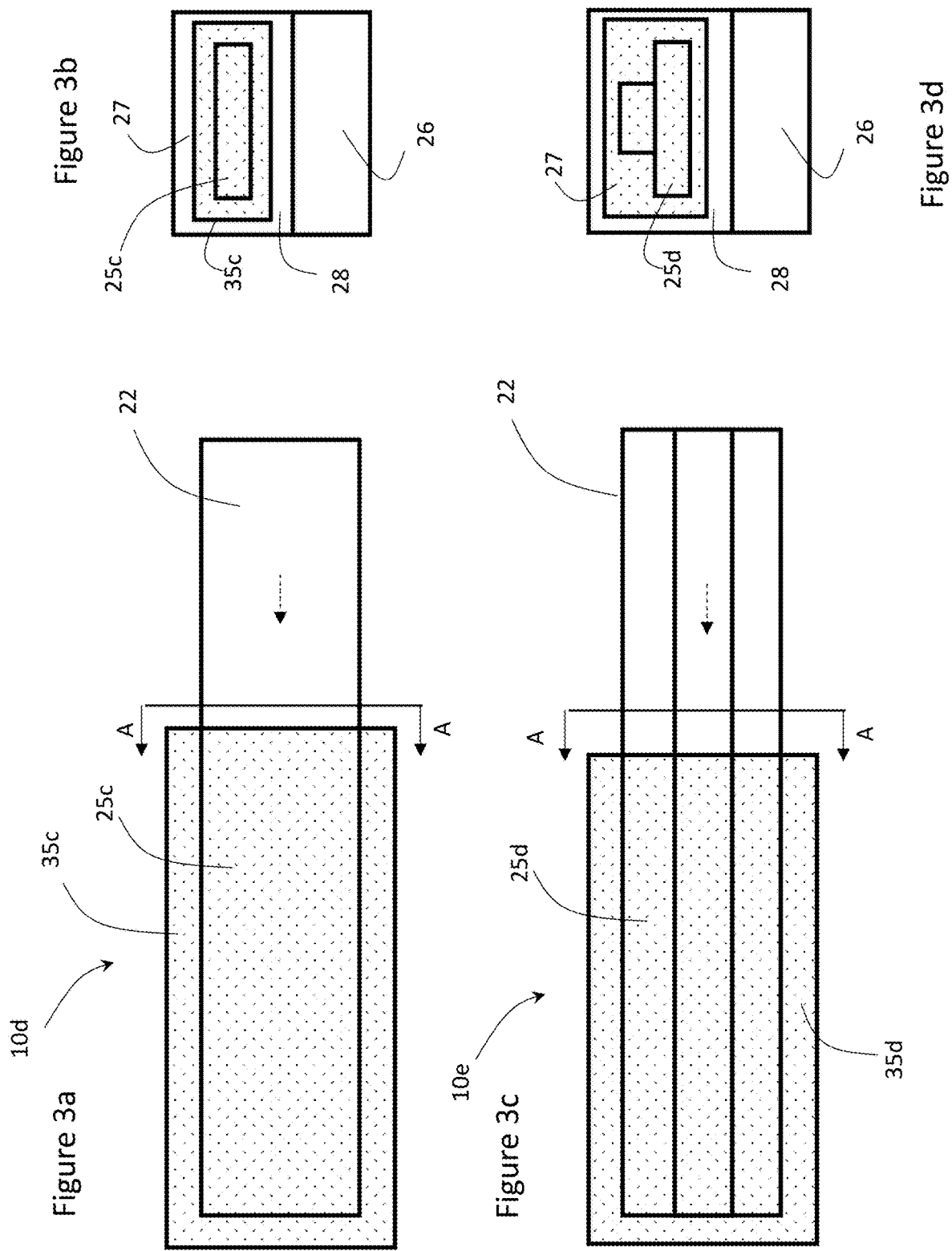

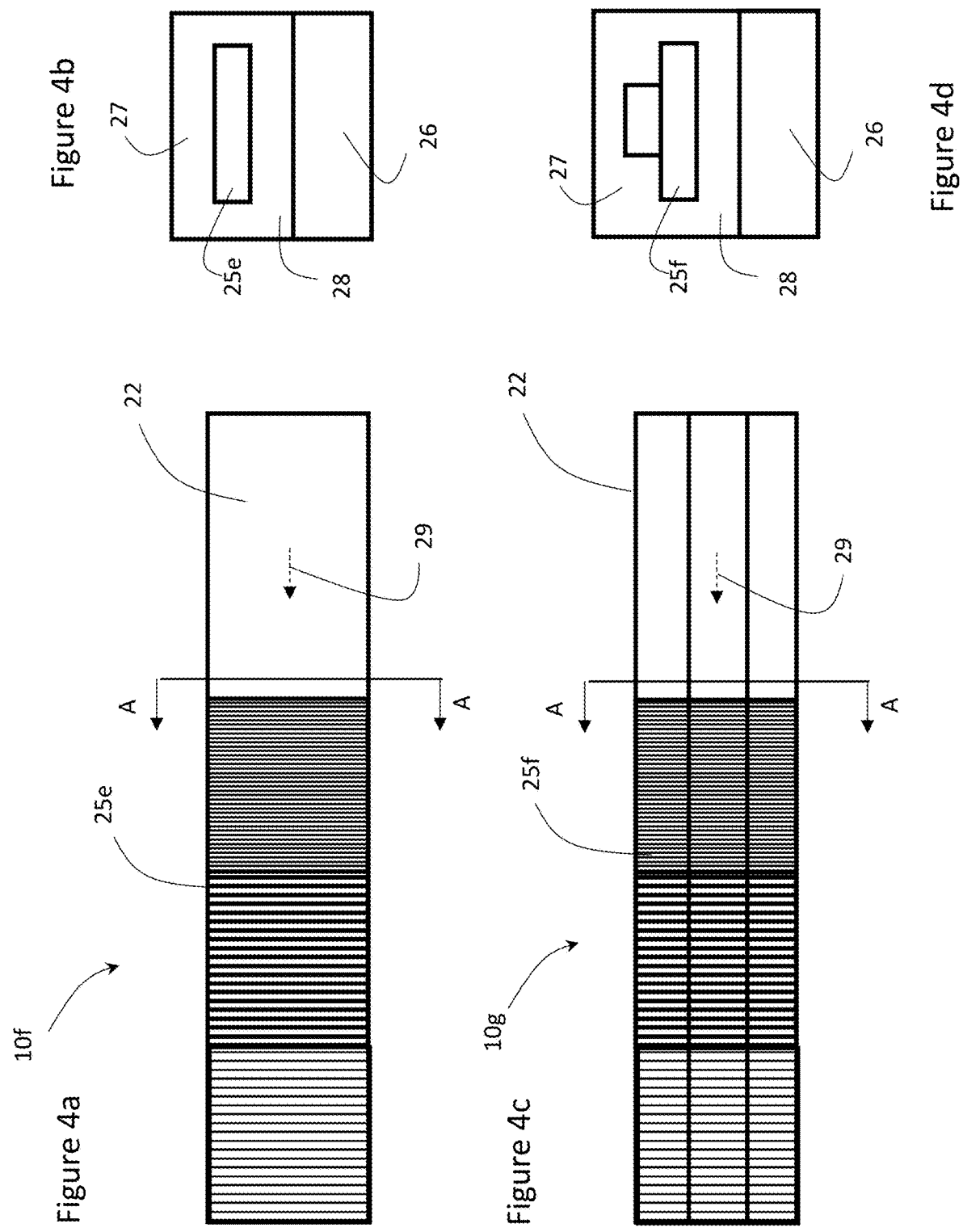

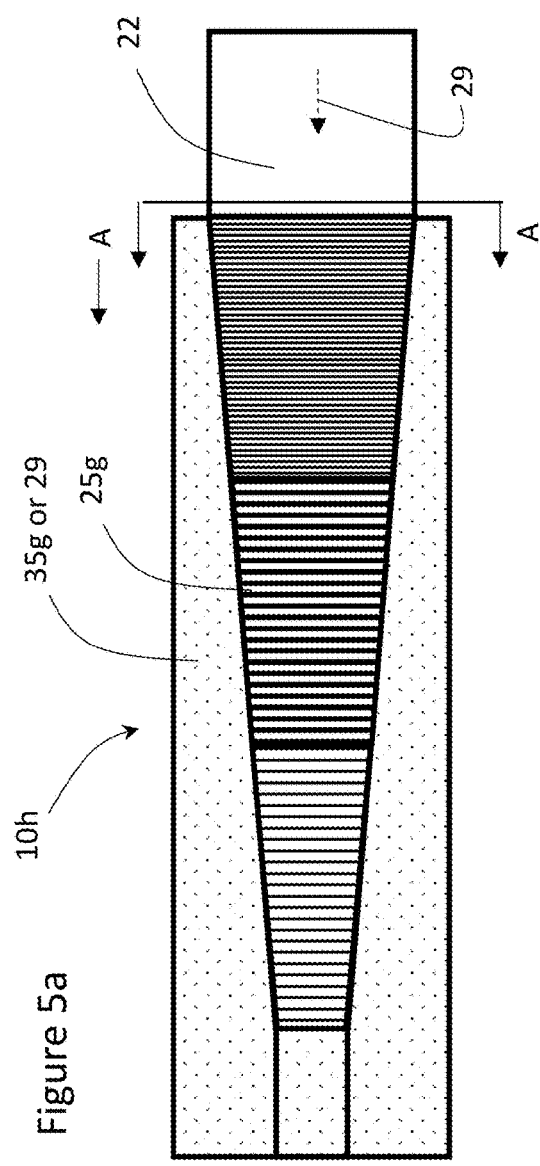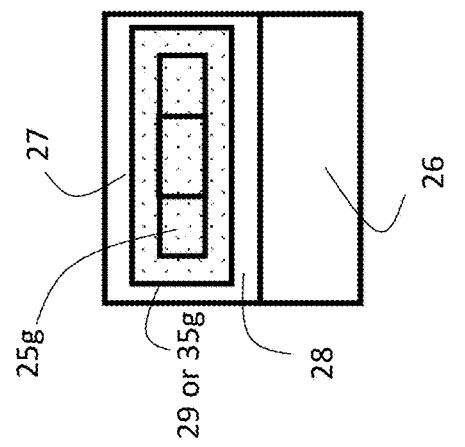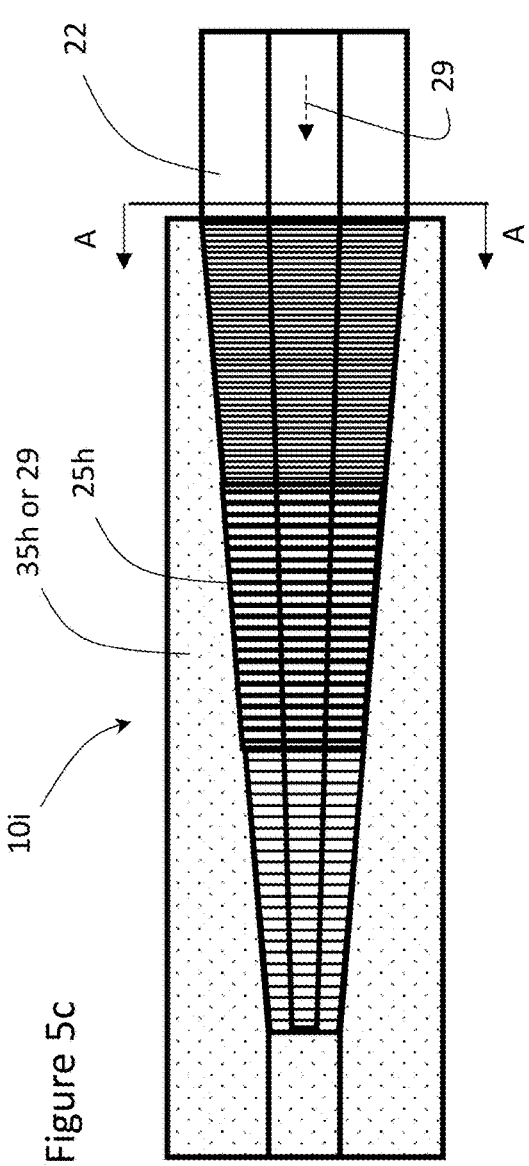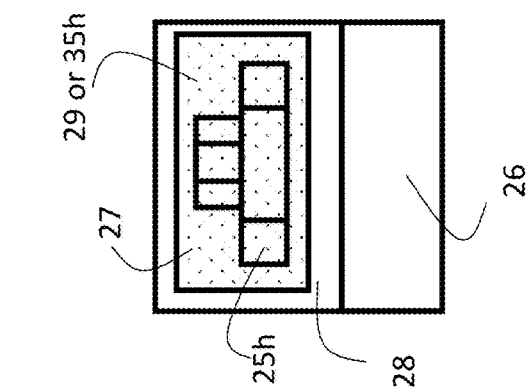
Figure 5a
Figure 5b
Figure 5c
Figure 5d

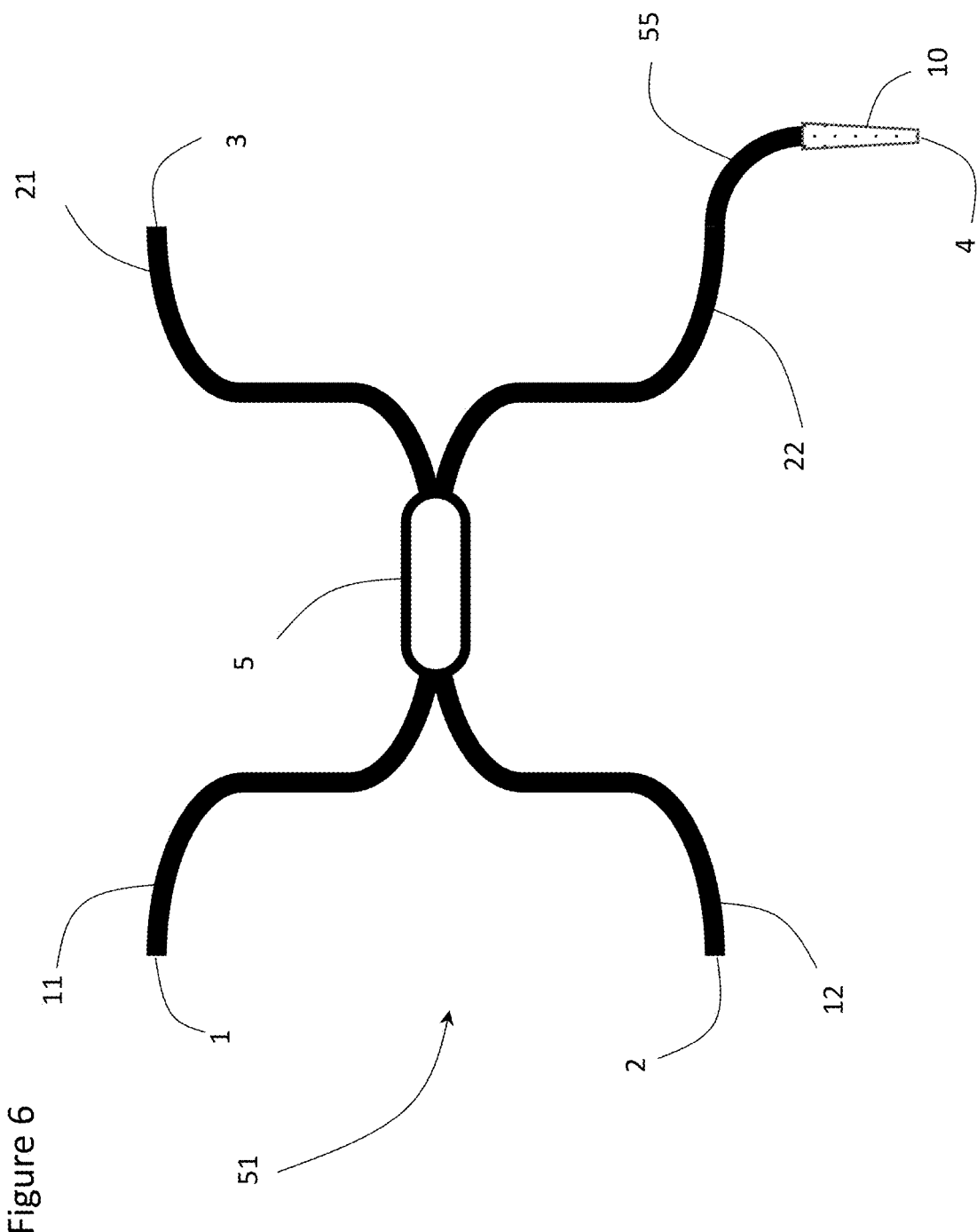

DUMP TERMINATOR

TECHNICAL FIELD

The present invention relates to a dump taper, and in particular to a dump taper for terminating an unused arm of a multi-port optical device to reduce back reflection.

BACKGROUND

With any high index contrast between waveguide and cladding, such as in silicon (Si) photonic systems or group III-V systems, any open port of a multi-port device, such as multi-mode interference (MMI) coupler, directional-coupler (DC), and Y-junction coupler, will cause strong back-reflection and/or scattering into the cladding. Back reflected or scattered light could get picked up by nearby components, adding to optical noise and cross-talk. In a standard design for a ridge waveguide defined in silicon (Si) and surrounded by a dielectric cladding, e.g. silicon-dioxide ($SiO_2$), the refractive index of Si is ~3.4 while the refractive index of $SiO_2$ is ~1.44. The high contrast between the Si and the $SiO_2$ results in reflection of ~20% (or −7 dB) of the light, if a waveguiding element is abruptly terminated, and the rest will be radiated into the substrate.

An object of the present invention is to overcome the shortcomings of the prior art by providing a dump terminator for controlling scattering of light and/or for absorption of light, while maintaining low reflection (<−30 dB).

SUMMARY OF THE INVENTION

Accordingly, the present invention relates to an optical coupling device comprising:
  at least one input port for inputting light;
  a coupling region connected to the at least one input port for dividing the light into first and second portions;
  a first output port connected to the coupling region for outputting the first portion of light;
  a second output port connected to the coupling region for outputting the second portion of light; and
  a dump terminator coupled to the end of the second output port for preventing the second portion of light from re-entering the coupling region.

BRIEF DESCRIPTION OF THE DRAWINGS

The invention will be described in greater detail with reference to the accompanying drawings which represent preferred embodiments thereof, wherein:
FIG. 2a is a plan view of an embodiment of a tapered dump terminator of the coupling device of FIG. 1;
FIG. 2b is a cross-sectional view of the tapered dump terminator of FIG. 2a along line A-A;
FIG. 2c is a plan view of an embodiment of a tapered rib dump terminator of the coupling device of FIG. 1;
FIG. 2d is an cross-sectional view of the tapered rib dump terminator of FIG. 2c along line A-A;
FIG. 3a is a plan view of an embodiment of a doped dump terminator of the coupling device of FIG. 1;
FIG. 3b is an cross-sectional view of the doped dump terminator of FIG. 3a along line A-A;
FIG. 3c is a plan view of an embodiment of a doped rib dump terminator of the coupling device of FIG. 1;
FIG. 3d is a cross-sectional view of the strip-loaded doped dump terminator of FIG. 3c along line A-A;
FIG. 4a is a plan view of an embodiment of a grating, dump terminator of the coupling device of FIG. 1;
FIG. 4b is an cross-sectional view of the grating, dump terminator of FIG. 5a along line A-A;
FIG. 4c is a plan view of an embodiment of a grating rib dump terminator of the coupling device of FIG. 1;
FIG. 4d is an cross-sectional view of the grating rib dump terminator of FIG. 4c along line A-A;
FIG. 5a is a plan view of an embodiment of a doped, grating, tapered dump terminator of the coupling device of FIG. 1;
FIG. 5b is an cross-sectional view of the doped, grating, tapered dump terminator of FIG. 5a along line A-A;
FIG. 5c is a plan view of an embodiment of a doped, grating, tapered rib dump terminator of the coupling device of FIG. 1;
FIG. 5d is an cross-sectional view of the doped, grating, tapered rib dump terminator of FIG. 5c along line A-A;
FIG. 6 is a plan view of a coupling device in accordance with another embodiment of the present invention.

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
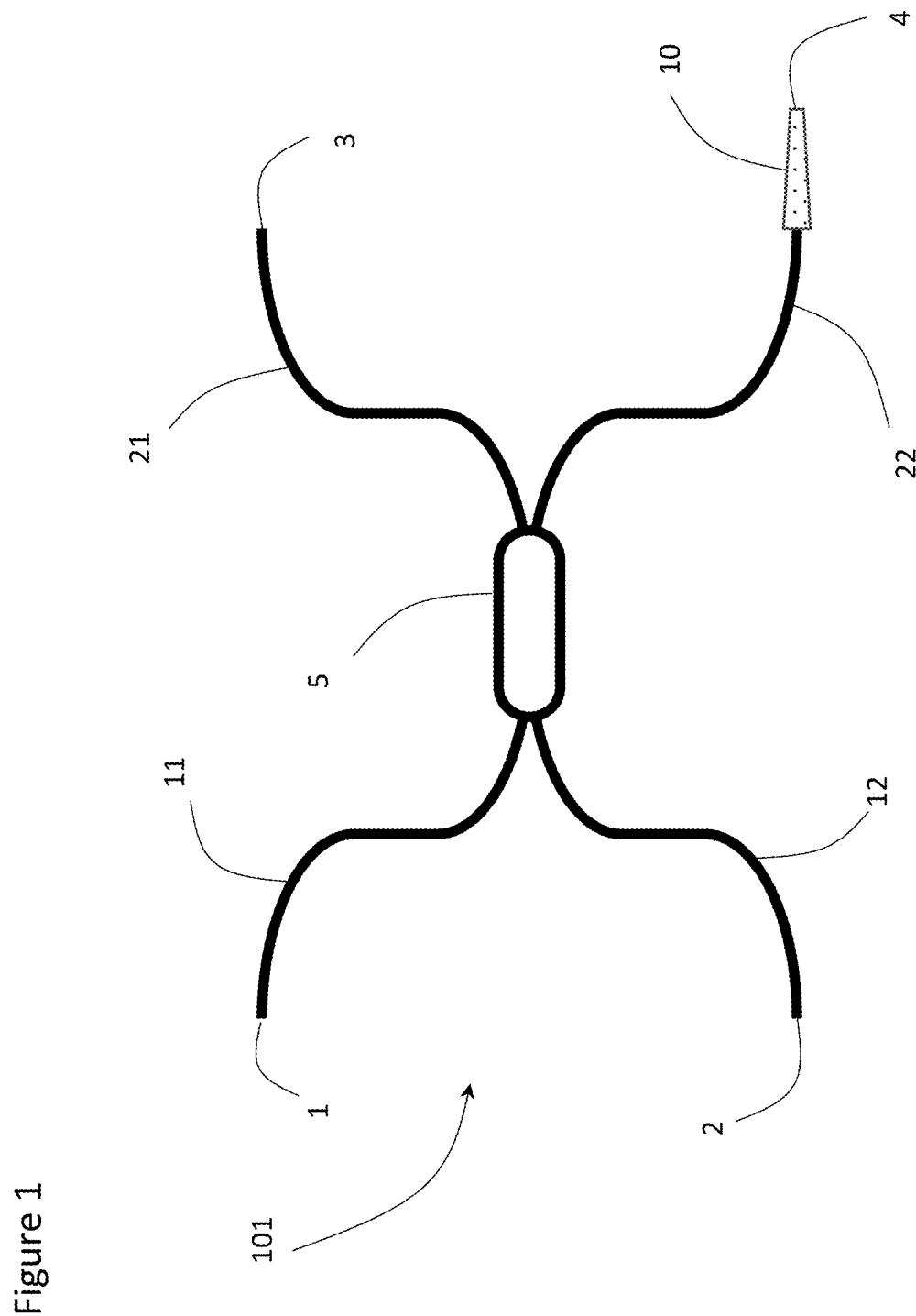
FIG. 1 is an plan view of a coupling device in accordance with an embodiment of the present invention.

An embodiment of the present invention, illustrated in FIG. 1, comprises a coupling device 101, such as multi-mode interference (MMI) coupler, a directional coupler (DC), and Y-junction coupler, including at least one input port, e.g. first and second input arms 11 and 12 on one side of the coupling device 101 comprising input ports 1 and 2, a coupling region 5, and at least one output port, e.g. first and second output arms 21 and 22 extending from an opposite side of the coupling device comprising output ports 3 and 4. Light entering one or more of the input ports, e.g. the first or second input arms 11 and 12, will enter the coupling region 5, be split into a plurality of output portions, e.g. first and second portions, in accordance with the splitting ratio of the coupling device 101, and then output to one or more of the output arms, e.g. output arms 21 and 22, in the propagation direction. In the illustrated embodiment, one or more of the output arms, e.g. the output arm 21, may be optically coupled for transmitting the first portion of the light to other optical devices, e.g. a modulator, and to an optical network, whereas one or more of the remaining arms, e.g. the second output arm 22 and/or one of the input arms, is terminated with a dump terminator 10 for receiving the remaining portions, e.g. the second portion, of the light. The input and the output ports, e.g. first and second input arms 11 and 12, and first and second output arms 21 and 22, may also comprise input/output ports enabling light to travel both in and out, and the coupling device 101 may be fully reciprocal enabling light travelling in either of the output ports 3 and 4 to be output one or all of the input ports 1 and 2.

The coupling device 101 may be mounted on a substrate 26, and may include top and bottom cladding layers 27 and 28, respectively, as well as cladding on each side of the waveguides, e.g. coupling region 5, first and second input arms 11 and 12, and first and second output arms 21 and 22.

The preferred embodiment includes a Si ridge waveguide with 220 nm height and 500 nm width in silicon-oxide (SiO$_2$) cladding; however, other types of waveguide geometry may be employed, including, but not limited to, rectangular ridge waveguides of varying thickness, multimode bus waveguide, strip-loaded waveguide, W-waveguides and rib waveguides. Different materials, such as Silicon Nitride (SiN), doped glass, Silicon Oxinitride (SiON), III-V materials, such as Gallium-Arsenide (GaAs) and others, may be used. Depending on the application different geometries may be used for different material systems and wavelength range. Typically, the device may be optimized for the telecom C-band (1530-1565 nm); however, minor adjustments to design may be made to work in the O-band (1260-1360 nm) or L-band (1565-1625 nm). The invention applies to other wavelength ranges as well with proper selection of material systems and waveguide geometry.

For simple passive applications, e.g. systems which may not have doping materials or strongly absorbing materials, a version of the terminator may be designed providing low reflection which scatters light away from nearby components to be eventually absorbed by the substrate 26. With reference to FIGS. 2a and 2b, to reduce back reflection, the dump terminator 10 may be comprised of a dump taper 10a, which may include a tapering waveguide section 25a, for receiving the light from the second output port 22 in the propagation direction 29. The tapering waveguide section 25 decreases in dimension, e.g. width and/or height, from a first width and/or height proximate the second output port 22 to a second thinner width and/or shorter height, e.g. less than half the original width or height, at an outer free end of the dump taper 10a so the effective index of the dump taper 10a gradually decreases and adiabatically transforms the mode from a guided waveguide mode into a leaky mode in the cladding surrounding the dump taper 10a. The gradual change in effective index enables nearly all the power in the mode to radiate into the cladding 27 and 28, and eventually be absorbed by the substrate 26, as opposed to an abrupt termination which results in strong reflection. The tapering waveguide section 25a may comprise any form for the waveguide width as a function of taper length, e.g. linear, polynomial, Bezier, etc.

Figure 2E:
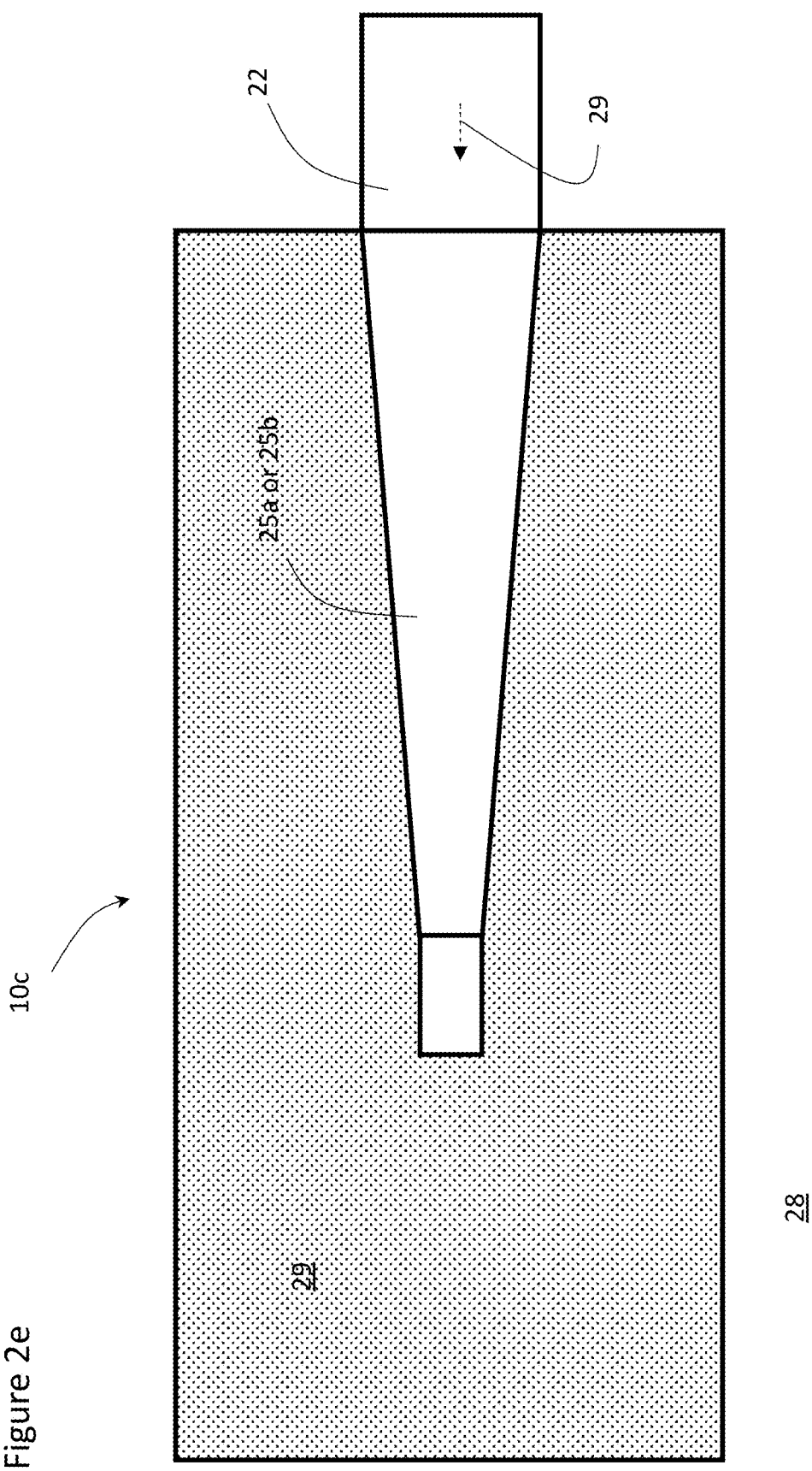
FIG. 2e is a plan view of an embodiment of a tapered dump terminator of the coupling device of FIG. 1.

In an alternative embodiment, illustrated in FIG. 2e, a material which has strong absorption at the wavelength range of interest, such as Germanium (Ge), is disposed, e.g. deposited, on one or more sides of the tapering waveguide section 25a or 25b in an optically absorbing enclosure 29 forming a dump taper terminator 10c. The dump taper terminator 10c is designed to gradually transition the optical mode from the waveguide, e.g. second output waveguide 22, into the enclosure 29, e.g. which has strong absorption in the O-band and C-band. Ideally, the enclosure 29 extends on either side of the tapering waveguide section 25a with the same height thereof, but the enclosure 29 may completely surround the tapering waveguide section 25a or 25b, e.g. extend into the cladding 27 and 28 above and below the tapering waveguide section 25a or 25b. Germanium has a refractive index ~4.2 at the wavelength range and an absorption coefficient ~1400 [1/cm] at the O-band and ~7000 [1/cm] at the C-band, making it a very efficient absorber at lower wavelengths. A gradual taper into the enclosure 29, as seen in FIG. 2c, may have low reflection and strong absorption without using doped materials. The size of the enclosure 29 depends on the wavelength of the application and desired level of absorption. As an example an enclosure of Germanium at 40 um width and length will attenuate the light >100 dB at a wavelength of 1310 nm.

The direction of the dump terminator 10 relative to the propagation directions of the other ports, e.g. ports 2 and 3, controls the direction of light scattering from the port 4. For example, in FIG. 1, the dump terminator 10 extends parallel to the propagation direction of light from ports 2 and 3, whereas in FIG. 6, a bend 55, e.g. 60°-180° bend from propagation direction, is introduced followed by a terminating dump terminator 10 to absorb light away from the upper output port 3, while keeping low back-reflection.

With reference to FIGS. 2c and 2d, to reduce back reflection, the dump terminator 10 may be comprised of a rib dump taper 10b, which may include a tapering rib waveguide section 25b, which includes a wider slab section and a narrower and taller rib section, that both decrease in dimension, e.g. width and/or height, in the propagation direction 29 from a first width and/or height proximate the second output port 22 to a second thinner width and/or shorter height, e.g. less than half the original width or height, at an outer free end of the rib dump taper 10b so the effective index of the rib dump taper 10b gradually decreases and adiabatically transforms the mode from a guided waveguide mode into a leaky mode in the cladding surrounding the dump taper 10b. The gradual change in effective index enables nearly all the power in the mode to radiate into the cladding 27 and 28, and eventually be absorbed by the substrate 26, as opposed to an abrupt termination which results in strong reflection. The tapering rib waveguide section 25b may comprise any form for the waveguide width as a function of taper length, e.g. linear, polynomial, Bezier, etc.

An example of a rib dump taper 25b, as in FIG. 2d, h denotes the full height of the hardmask layer, e.g. typically 200 nm-250 nm, ideally 220 nm, and $h_{slab}$ denotes the height of the slab layer, usually 90-100 nm. The width of the hardmask layer, may be between 400-550 nm, ideally 500 nm for applications in the C-band, and 420 for applications in the O-band.

The same ridge or rib taper 25a and 25b may also be used in the reverse direction to collect and focus a propagating mode in layers above and below the cladding layers 27 and 28, e.g. the substrate 26, into a waveguide mode in the ridge or rib waveguide 22.

The ridge and rib dump tapers 25a and 25b may be designed and optimized using FDTD simulations to maximize transmission into the cladding 27 and 28 and minimize back-reflection into the optical system. In a silicon photonics chip the waveguide material may be comprised of silicon (Si) and the cladding surrounding the waveguide may be silicon-dioxide (SiO$_2$) which has a much lower refractive index, e.g. n=1.44. The adiabatic tapering waveguide section 25a may be based on a ridge waveguide, the cross-section of the which is illustrated in FIG. 2b. Standard parameters for such a waveguide, intended for use in the C-band, may be a height, h=200 nm-250 nm, ideally h=220 nm, and initial width, $w_0$=450 nm-550 nm, ideally $w_0$=500 nm. The adiabatic tapering waveguide section 25a may gradually lower the effective index of the mode from ~2.4 in the Si ridge waveguide at the output port 22 until a guided mode is no longer supported by the tapering waveguide section 25a at which point the mode leaks into the cladding 27 and 28 with minimal back-reflection. This is done by varying the taper width of the tapering waveguide section 25a from the initial waveguide width, $w_0$, down to some minimal width, $w_1$, e.g. less than one half the original width, preferable less than one third of the original width, and in the case of the example, $w_1$=150 nm. The taper width as a function of length may be varied using any adiabatic function, f(x), which changes the mode from a propagating mode in the waveguide 22 to a leaky mode/modes in the surrounding cladding 27 and 28. Accordingly, the dump terminator 10a or 10b may be at least 15 µm long, preferably between 15 µm and 150 µm, and ideally between 20 µm to 120 µm long; however, any length may be possible depending on the application.

With reference to FIGS. 3a and 3b, to reduce back reflection and absorb incoming light, the dump terminator 10 may also or alternatively be comprised of a doped dump terminator 10d, which may include a doped waveguide section 25c, that absorbs the propagating mode therein. Doping the waveguide section 25c with either positive (P-type) or negative (N-type) dopants increases the absorption coefficient while keeping the index difference between the doped and undoped regions minimal. FIGS. 3a and 3b illustrate an example using doped Si waveguide with ~40 dB of absorption for scattered light and 80 dB of absorption for back-reflected light. The doped region may also be extended beyond the waveguide section 25c into a doped cladding section 35c surrounding the waveguide section 25c to ensure coverage of the mode's optical field.

With reference to FIGS. 3c and 3d, to reduce back reflection, the dump terminator 10 may also or alternatively be comprised of a doped rib dump terminator 10e, which may include a doped rib waveguide section 25d, which includes a wider slab section and a narrower and taller rib section, that both absorb the propagating mode therein. Doping the rib waveguide 25d with either positive (P-type) or negative (N-type) dopants increases the absorption coefficient while keeping the index difference between the doped and undoped regions minimal. The doped region may also be extended beyond the waveguide section 25d into a doped cladding section 35d surrounding the waveguide section 25d to ensure coverage of the mode's optical field.

For doped waveguide sections 25c and 25d in silicon systems the change in refractive index Δn and absorption coefficient Δα at 1550 nm is given by:

$$\Delta n = -5.4 \times 10^{-22} \Delta N^{1.011} - 1.53 \times 10^{-18} \Delta P^{0.838}$$

$$\Delta \alpha = 8.88 \times 10^{-21} \Delta N^{1.187} + 5.84 \times 10^{-20} \Delta P^{1.109}$$

where ΔN and ΔP are the carrier densities of electrons and holes respectively [cm$^{-3}$], and Δn and Δα are the changes in refractive index and absorption of Si respectively. For Si n-type dopants such as Phosphorus, Arsenic, Antimony, Bismuth, and Lithium may be used. Choices of p-type dopants include Boron, Aluminium, Gallium and Indium. Doping enables strong absorption in the doped region 25c, 25d, 35c and 35d while keeping the refractive index difference small enough so that reflection at the interface between doped and undoped regions is negligible (<−80 dB). In one particular example: phosphorus doping with carrier concentration of $1 \times 10^{18}$ cm$^{-3}$ is used to achieve absorption of ~1 dB/µm, i.e. a 40 µm doped waveguide section 24c or 25d may achieve ~40 dB of absorption, i.e. absorbs 0.9999 of incident light. Accordingly, the dump terminator 10c or 10d comprises at least $1 \times 10^{18}$ cm$^{-3}$ dopant concentration, and may be at least 30 µm long, preferably at least 40 µm long, and ideally between 30 µm to 50 µm long.

With reference to FIGS. 4a and 4b, the dump terminator 10 may also or alternatively be comprised of a grating dump terminator 10f, comprised of a subwavelength grating section 25e, in which the fill ratio of the waveguide high index material to the cladding low index material is gradually decreased with length in the propagation direction 29 from the inner end closest to the second output waveguide 22 to the outer free end farthest from the second output waveguide 22, which may also function to ensure full transmission of the propagating mode into the surrounding cladding 27 and 28 with relatively low back-reflection.

With reference to FIGS. 4c and 4d, the dump terminator 10 may also or alternatively be comprised of a grating rib dump terminator 10g, comprised of a subwavelength grating rib section 25f, which includes a wider slab section and a narrower and taller rib section, in which the fill ratio of the waveguide high index material to the cladding low index material is gradually decreased with length in the propagation direction 29 from the inner end adjacent the second output waveguide 22 to the outer free end, which may also function to ensure full transmission of the propagating mode into the surrounding cladding 27 and 28 with relatively low back-reflection. Accordingly, the dump terminator 10f or 10g may be at least 30 µm long, preferably at least 40 µm long, and ideally between 30 µm to 120 µm long.

With reference to FIGS. 5a to 5d, two or more of the means above may be combined to create a strip or rib low-reflection dump terminator 10. Accordingly, the dump terminator 10 may comprise a doped, grating dump strip or rib taper 10h or 10i, respectively, including a subwavelength grating, doped and tapering section 25g or 25h with the features hereinbefore described with reference to FIGS. 2a to 4d, which may be surrounded by doped cladding section 35g or 35h or an absorptive material, e.g. germanium, enclosure 29.

With reference to FIG. 6, a coupling device 51, including similar elements as the coupling device 101 (as indicated by similar reference numerals), and any one of the dump terminators 10a-10i, as hereinbefore described, may also include a bend waveguide 55 coupled to the end of the second output waveguide arm 22 in order to scatter light away from nearby components, e.g. first output waveguide arm 21 and any components coupled thereto. The bend waveguide 55 may comprise a substantially 90° bend to redirect a propagation direction of light in the second output waveguide arm 22 away from, e.g. substantially perpendicularly to, that of the first output waveguide arm 21 and/or the second input waveguide arm 12. Any acute angle, e.g. 45°-180°, from the propagation axis of the second output waveguide arm 22 is possible depending on the placement of other optical components on the substrate.

The dump terminators 10a to 10i disclosed herein may also be used for any application or optical component, which requires low reflection or directed scattering into a cladding or substrate. For example, when the reflection of an on-chip component is measured, such as MMI, Y-junction, PD, etc., any addition to the ports of the component would add to the device reflection. Even a straight waveguide has a certain amount of back-reflection due to side-wall scattering. The use of absorbing dump terminators, e.g. 10c,10d, and 10e, may fully absorb unwanted light with minimal back-reflection which minimizes the reflection effect of unused ports on the measurement. Accordingly, any optical device, i.e. with one or more input ports 1 and/or 2 and one or more output ports 3 and/or 4, may be substituted for the coupling region 5 in FIGS. 1 and 6, and include one of the dump terminators 10a-10i at the end of one or more of the waveguides 11, 12, 21 or 22.

Certain applications may require collecting several unused ports from a plurality of devices. One option is to terminate each port with an absorbing dump terminator 10c, 10d, 10e, 10h or 10i, or a scattering dump terminator 10a, 10b, 10f or 10g, which scatters light away from nearby components. However, some applications may prohibit doping near certain devices or too tightly packed to safely scatter light near the unused port. For these specialized applications the best course of action is to route unused light from any unused port to a section of the PIC (photonic integrated circuit) where the light may be either absorbed or safely scattered away into the substrate by dump terminators 10a-10i.

Figure 7:
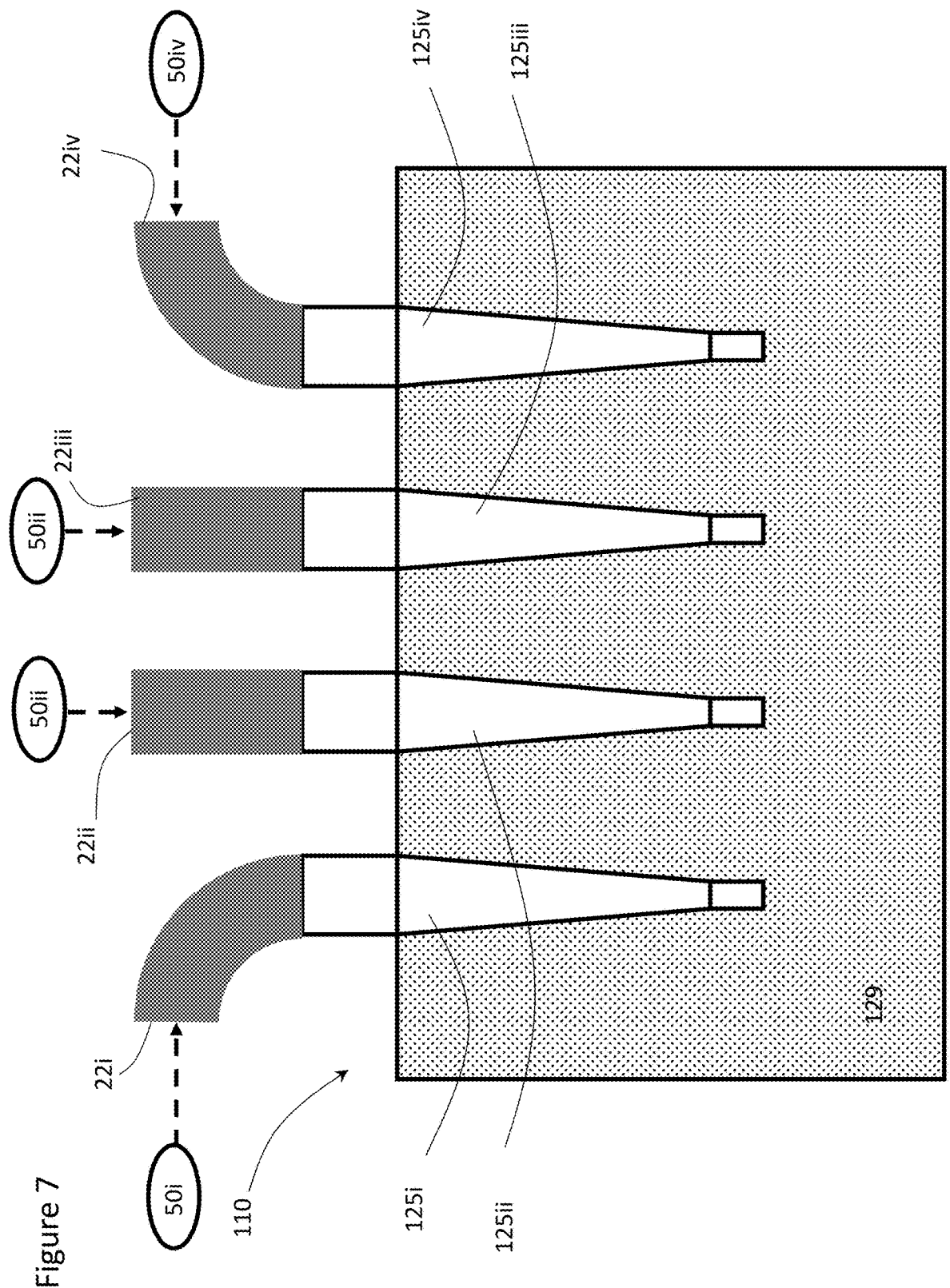
FIG. 7 illustrates a common dump section for a plurality of dump terminators, in accordance with an embodiment of the present invention.

With reference to FIG. 7, light from various devices, e.g. 50i-50iv, on the PIC is routed via waveguides 22i to 22iv to a dump section 110. A dump terminator 125i to 125iv is provided at the end of each waveguide 22i to 22iv, which may comprise any one of the aforementioned dump terminators 10a-10i, but ideally includes a single, combined dump region 129, which may be either doped or undoped. The dump terminators 125i to 125iv may be surrounded, e.g. sides and/or top and bottom, by the dump region 129, which may either be normal cladding, e.g. $SiO_2$, or an absorbing material, e.g. Ge, for applications where doping cannot be used. Depending on choice of materials light reaching the dump region 129 may be either absorbed (either via doped terminators or Ge cladding) or scattered without coupling to other devices on chip while maintaining low back-reflection.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An optical coupling device comprising:
    at least one input port for inputting light;
    a coupling region connected to the at least one input port for dividing the light into first and second portions;
    a first output port connected to the coupling region for outputting the first portion of light;
    a second output port connected to the coupling region for outputting the second portion of light; and
    a dump terminator coupled to the second output port for preventing the second portion of light from re-entering the coupling region;
    wherein the dump terminator comprises a doped waveguide section comprising either positive or negative dopants for increasing an absorption coefficient of the doped waveguide section while keeping an index difference between the doped waveguide section and undoped regions minimal; and
    wherein the dump terminator further comprises a doped cladding section surrounding the doped waveguide section.

2. The device according to claim 1, wherein the dump terminator comprises a tapering waveguide section, tapering from an inner wider end proximate the second output port to an outer thinner outer free end, whereby an effective index of the tapering waveguide section gradually decreases and adiabatically transforms the light from a guided waveguide mode into a leaky mode in cladding surrounding the tapering waveguide section.

3. The device according to claim 2, wherein the tapering waveguide section comprises a rib waveguide.

4. The device according to claim 1 wherein the dump terminator comprises a subwavelength grating section surrounded by cladding, in which a fill ratio of waveguide material to cladding material is gradually decreased from an inner end closest to the second output port to an outer free end for transmitting a propagating mode into the cladding.

5. The device according to claim 1, wherein the dump terminator is 15 μm to 150 μm long.

6. The device according to claim 1, wherein the dump terminator further comprises a bend section redirecting a propagation direction away from the first output port.

7. An optical coupling device comprising:
    at least one input port for inputting light;
    a coupling region connected to the at least one input port for dividing the light into first and second portions;
    a first output port connected to the coupling region for outputting the first portion of light;
    a second output port connected to the coupling region for outputting the second portion of light; and
    a dump terminator coupled to the second output port for preventing the second portion of light from re-entering the coupling region;
    wherein the dump terminator comprises a tapering waveguide section, tapering from an inner wider end proximate the second output port to an outer thinner outer free end, whereby an effective index of the tapering waveguide section gradually decreases and adiabatically transforms the light from a guided waveguide mode into a leaky mode in cladding surrounding the tapering waveguide section;
    wherein the dump terminator comprises an optically absorbing enclosure on either side of the tapering waveguide section; and
    wherein the optically absorbing enclosure comprises germanium.

8. An optical coupling device comprising:
    at least one input port for inputting light;
    a coupling region connected to the at least one input port for dividing the light into first and second portions;
    a first output port connected to the coupling region for outputting the first portion of light a second output port connected to the coupling region for outputting the second portion of light; and
    a dump terminator coupled to the second output port for preventing the second portion of light from re-entering the coupling region;
    wherein the dump terminator comprises a doped waveguide section comprising either positive or negative dopants for increasing an absorption coefficient of the doped waveguide section while keeping an index difference between the doped waveguide section and undoped regions minimal; and
    wherein the doped waveguide section comprises a rib waveguide.

9. The device according to claim 8, wherein the dump terminator further comprises a doped cladding section surrounding the doped waveguide section.

10. The device according to claim 8, wherein the dump terminator comprises a subwavelength grating section surrounded by cladding, in which a fill ratio of waveguide material to cladding material is gradually decreased from an inner end closest to the second output port to an outer free end for transmitting a propagating mode into the cladding.

11. The device according to claim 8, wherein the dump terminator comprises a tapering waveguide section, tapering from an inner wider end proximate the second output port to an outer thinner outer free end, whereby an effective index of the tapering waveguide section gradually decreases and adiabatically transforms the light from a guided waveguide mode into a leaky mode in cladding surrounding the tapering waveguide section.

12. An optical coupling device comprising:
    at least one input port for inputting light;

a coupling region connected to the at least one input port for dividing the light into first and second portions;

a first output port connected to the coupling region for outputting the first portion of light;

a second output port connected to the coupling region for outputting the second portion of light; and a dump terminator coupled to the second output port for preventing the second portion of light from re-entering the coupling region;

wherein the dump terminator comprises a subwavelength grating section surrounded by cladding, in which a fill ratio of waveguide material to cladding material is gradually decreased from an inner end closest to the second output port to an outer free end for transmitting a propagating mode into the cladding.

13. The device according to claim 12, wherein the dump terminator comprises a doped waveguide section comprising either positive or negative dopants for increasing an absorption coefficient of the doped waveguide section while keeping an index difference between the doped waveguide section and undoped regions minimal.

14. The device according to claim 13, wherein doped waveguide section of the dump terminator includes $1 \times 10^{18}$ cm$^{-3}$ dopant concentration.

15. The device according to claim 12, wherein the dump terminator comprises a tapering waveguide section, tapering from an inner wider end proximate the second output port to an outer thinner outer free end, whereby an effective index of the tapering waveguide section gradually decreases and adiabatically transforms the light from a guided waveguide mode into a leaky mode in the cladding surrounding the tapering waveguide section.

* * * * *